United States Patent
Jensen et al.

(10) Patent No.: US 8,314,053 B2
(45) Date of Patent: Nov. 20, 2012

(54) COMPONENT FOR THE SLIDING SUPPORT OF ANOTHER COMPONENT, AND PROCESS FOR PRODUCING IT

(75) Inventors: Jens Dahl Jensen, Berlin (DE); Ursus Krüger, Berlin (DE); Heike Schiewe, Berlin (DE); Manuela Schneider, Berlin (DE); Gabriele Winkler, Berlin (DE); Hartmut Walter, Berlin (DE)

(73) Assignee: Siemens Aktiengesellschaft, München (DE)

( * ) Notice: Subject to any disclaimer, the term of this patent is extended or adjusted under 35 U.S.C. 154(b) by 186 days.

(21) Appl. No.: 12/676,500

(22) PCT Filed: Sep. 4, 2008

(86) PCT No.: PCT/EP2008/061675
§ 371 (c)(1),
(2), (4) Date: Mar. 4, 2010

(87) PCT Pub. No.: WO2009/030722
PCT Pub. Date: Mar. 12, 2009

(65) Prior Publication Data
US 2010/0183254 A1     Jul. 22, 2010

(30) Foreign Application Priority Data

Sep. 5, 2007   (DE) .................. 10 2007 042 382

(51) Int. Cl.
*F16C 33/06* (2006.01)
*C10M 103/06* (2006.01)

(52) U.S. Cl. ........................................ 508/100; 508/108

(58) Field of Classification Search .................. 508/100, 508/103, 155, 108
See application file for complete search history.

(56) References Cited

U.S. PATENT DOCUMENTS

| 3,206,264 A | 9/1965 | Dalzell |
| 6,071,841 A * | 6/2000 | Sumiya ........................ 501/96.4 |
| 2003/0180565 A1* | 9/2003 | Herbst-Dederichs ......... 428/553 |

FOREIGN PATENT DOCUMENTS

| DE | 3128412 A1 | 1/1983 |
| DE | 3724614 A1 | 1/1988 |
| DE | 4038139 A1 | 6/1992 |
| DE | 202006006813 U1 | 7/2006 |

(Continued)

*Primary Examiner* — Jim Goloboy
(74) *Attorney, Agent, or Firm* — Henry M. Feiereisen LLC

(57) ABSTRACT

The invention relates to a component that is suitable for use as a sliding bearing. The invention further relates to a method for the production of said component. The design of the component according to the invention provides a layer of a light metal material (13), which is provided with an oxide layer (15) containing pores (16) in the direction of the sliding surface (23) of the component. A hard material (18) is placed in the pores, which greatly increases the firmness of said layer region, thus creating the mechanical firmness for use as a sliding bearing. In order to counteract the tendency of said firm layer region to experience brittle failure, the oxide layer (15) is coated with a solid lubricant layer (20). Said solid lubricant layer comprises a metallic, ductile matrix (21), which distributes a force (F) acting at certain points over a larger surface region (b). In order to improve the sliding characteristics, particles of a solid lubricant (22) are simultaneously embedded in the solid lubricant layer (20).

12 Claims, 2 Drawing Sheets

FOREIGN PATENT DOCUMENTS

| | | | |
|---|---|---|---|
| DE | 202006006813 U1 * | 8/2006 | |
| EP | 167102 A1 * | 1/1986 | |
| EP | 1231299 A1 | 8/2002 | |
| EP | 1273679 A1 | 1/2003 | |
| JP | 5025696 A | 2/1993 | |
| JP | 05086380 A * | 4/1993 | |

* cited by examiner

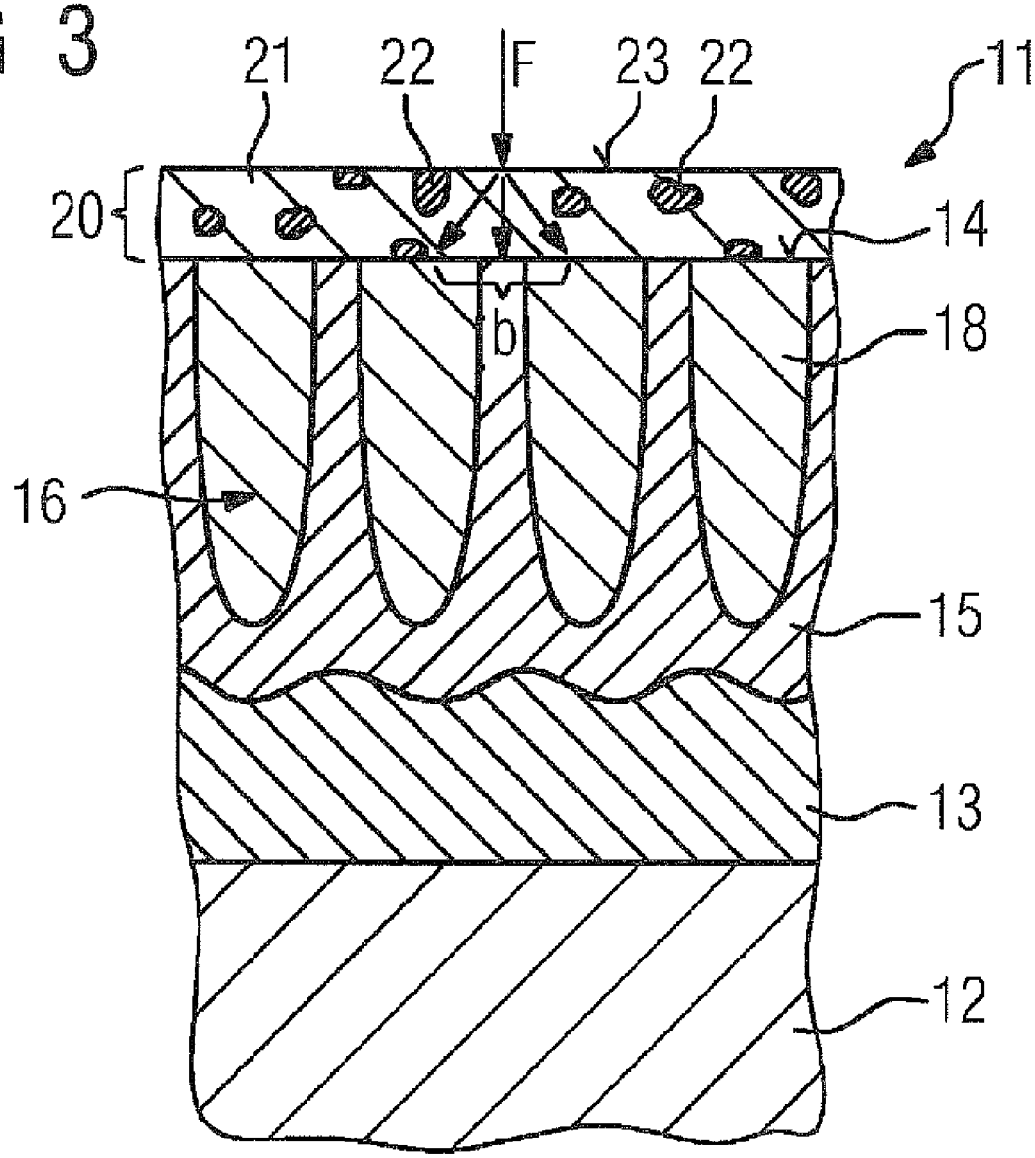

COMPONENT FOR THE SLIDING SUPPORT OF ANOTHER COMPONENT, AND PROCESS FOR PRODUCING IT

CROSS-REFERENCES TO RELATED APPLICATIONS

This application is the U.S. National Stage of International Application No. PCT/EP2008/061675, filed Sep. 4, 2008, which designated the United States and has been published as International Publication No. WO 2009/030722 and which claims the priority of German Patent Application, Serial No. 10 2007 042 382.0, filed Sep. 5, 2007, pursuant to 35 U.S.C. 119(a)-(d).

BACKGROUND OF THE INVENTION

The invention relates to a component having a sliding surface which is intended for the sliding support of another component, wherein the component is made at least partially of a light metal material. The boundary surface of this light metal material is oxidized on the side which faces the sliding surface, and is provided with pores which are open toward the boundary surface. In addition, this boundary surface is provided with a solid lubricant layer.

A component having a sliding surface of the type indicated in the introduction in the form of a composite plain bearing is known, for example, from DE 40 38 139 A1. This plain bearing has a steel support layer which ensures the mechanical strength of the component. An aluminum alloy layer, i.e. a layer made of a light metal material, is applied to said steel support layer, and the boundary surface of said aluminum alloy layer simultaneously forms the surface of the bearing inner side and therefore the sliding surface for the component to be mounted. On the surface, the aluminum alloy has been converted into an aluminum oxide; this can take place, for example, by eloxing. In this process, open pores which can be impregnated with a solid lubricant are produced in the boundary surface. During operation, the solid lubricant is therefore available for lubricating the component to be mounted.

It is also known from the abstract of JP 05025696-A that a boundary layer having pores of aluminum oxide which are open toward the latter serves as a substrate for a coating with a solid lubricant. This then forms a further layer which forms the sliding surface for a component to be mounted on the boundary layer, wherein the solid lubricant also penetrates into the pores which are open toward the boundary layer. This provides reliable anchoring of the solid lubricant layer on the boundary layer.

According to DE 37 24 614 A1, another possibility for increasing the service life of aluminum composite bearings is that the aluminum oxide layer can be saturated with a metal salt which forms a complex with the aluminum oxide. This increases the strength and hardness and also the corrosion resistance of the aluminum oxide layer. However, the improvement in the service life of such an aluminum oxide layer also depends greatly on the material conditions of the mounted component.

According to DE 31 28 412 A1, it is also possible to provide metallic bearings with self-lubricating properties if additives having dry lubricant properties are introduced into the metal matrix of the bearing, which matrix has interspaces for a second matrix of functional additives.

According to EP 1 273 679 A1, it is also possible for a porous layer of aluminum oxide to be applied to a hard material layer which protects the component. By way of example, lubricant particles can then be incorporated in the pores of the aluminum oxide. This produces a functional layer which covers the hard material layer.

It is also known from U.S. Pat. No. 3,206,264 that a porous surface of a base component for bearings can be used to improve the adhesion of an applied layer by increasing the size of the boundary surface between these two materials, and therefore layer adhesion is ensured in the case of bearings subjected to thermal loads even when the two component regions have different coefficients of thermal expansion.

DE 20 2006 006 813 U1 also discloses that a surface of anodically oxidized aluminum with the pores thereby formed can be available for receiving the finest particles of a dry lubricant.

SUMMARY OF THE INVENTION

The object of the invention is to provide a component having a sliding surface for support another component, wherein light metal materials are used and which component simultaneously has a comparatively high mechanical strength.

According to the invention, this object is achieved by the component indicated in the introduction in that the pores are filled with a hard material, and the solid lubricant layer which is made of a metal alloy and has a metallic matrix and a microstructure phase which is distributed therein and is made of a solid lubricant is applied to the boundary surface with the filled pores. The filling of the pores in the boundary surface with a hard material has the advantageous result that, despite the use of a light metal material having comparatively low strength values, the mechanical strength of the component as a whole can be increased. In the light metal material, this provides a very high strength, specifically in the vicinity of the boundary layer which is subjected to the loads by the component to be mounted. However, this requires the pores which are produced by the oxidation of the boundary surface to be filled with a hard material which can even have a higher strength than the oxide of the light metal material.

However, the greatly increased strength of the boundary layer is also accompanied by increased brittleness of the microstructure of the oxidized and filled light metal material which is close to the boundary surface. Therefore, the invention further provides that a solid lubricant layer having a metallic matrix is applied to the oxide of the light metal material which is filled with hard material. The metallic matrix is advantageously much more ductile than the substrate which provides the boundary layer, and therefore loads which are applied by the component to be mounted can be distributed more uniformly over the surface provided by the boundary layer. This makes it possible to reduce stress peaks which could lead to brittle fracture of the oxidized light metal material filled with hard material.

At the same time, the property of dry lubrication of the component is advantageously ensured by introducing a microstructure phase made of a solid lubricant into the metallic matrix. By way of example, this can be made of a disperse distribution of solid lubricant particles. These are then also available at the surface of the solid lubricant layer, where they can unfurl their properties as a solid lubricant.

Even if the solid lubricant layer becomes worn, sufficient lubrication can be ensured by a uniform degree of filling of the microstructure phase in the solid lubricant layer, and so the solid lubricant layer in the metallic matrix provides a deposit of solid lubricant, so to speak. In this context, it has to be taken into account that the solid lubricant layer simultaneously has to perform a stabilizing function. As a result, the solid lubricant layer cannot be completely worn away if wear progresses; instead, it is necessary to define a minimum thickness for the remaining solid lubricant layer at which the mechanical protective effect is still sufficient for the brittle substrate which forms the boundary surface.

The phase made of the solid lubricant can advantageously be provided with a high concentration, in particular in that region of the solid lubricant layer which is worn away during operation. Therefore, fewer or even no particles of the microstructure phase of the solid lubricant may be provided in that region which must remain in order to stabilize the substrate on the boundary layer. In the first instance, the proportion of the solid lubricant layer which itself has to remain on the component would have at least emergency running properties if component exchange is not immediately possible. However, if the proportion of the microstructure phase of the solid lubricant is reduced in this region of the layer, the rate of the progressive wear can thereby simultaneously be reduced, in order to ensure the mechanical stability of the component for as long as possible.

In order to obtain a solid lubricant layer with a profile of requirements which depends on the layer depth, it is possible, for example, for the solid lubricant layer to be in the form of a gradient layer having a concentration of solid lubricants in the distributed microstructure phase which increases toward the sliding surface. A solid lubricant layer comprising a plurality of layers (multilayer layer) is also conceivable, where the layer which forms the sliding surface has the highest solid lubricant content, and the layer which lies directly on the boundary surface of the oxidized light metal material has the lowest solid lubricant content or does not contain any solid lubricant at all. By way of example, it is possible for another layer to be formed between these layers in order to produce the emergency running properties already mentioned above, and this layer has a lower solid lubricant content than the layer which is close to the sliding surface. It is also possible for different metals to be used as the metallic matrix in the different layers, and these metals, for example, slow down the wear of the layers close to the boundary layer further or, owing to increased ductility compared to the layers close to the sliding surface, make it possible for the loads to be distributed particularly effectively over the boundary surface which is formed by the oxidized and filled light metal material.

One refinement of the invention provides for the light metal material to be aluminum or an aluminum alloy. This material is advantageously noted for high availability and low material costs. In addition, the oxidation of aluminum surfaces is widely investigated, for example, by generally known eloxing treatments and can readily be controlled as a process.

Another refinement of the invention is obtained if the hard material is aluminum oxide, silicon oxide, cubic boron nitride, silicon carbide, titanium nitride or a mixture of these compounds. The use of aluminum oxide as hard material advantageously makes it possible to produce a particularly homogeneous assembly if aluminum is also used as the light metal material. Specifically, the eloxing treatment also allows aluminum oxide to be produced as webs between the pores in the oxidized region. Furthermore, the other compounds or mixtures of all the compounds advantageously make it possible to produce specific property profiles for the region of the component close to the boundary layer, and these profiles make adaptation to different applications possible. Here, attention should be paid firstly to the hardness of the compounds used and also to the possibility to influence the brittleness of the assembly produced.

Advantageously, the solid lubricant used may be molybdenum sulfide, tungsten sulfide, tantalum sulfide, graphite or a mixture of these compounds. These are advantageously solid lubricants which, owing to their layered crystal lattice, are highly effective as a solid lubricant.

It is also advantageous if the metallic matrix of the solid lubricant layer is a nickel- and/or cobalt-containing alloy. In particular, these have the ductility which is required for the solid lubricant layer and for effective protection of the boundary layer. In addition, these metals and the alloys thereof have a good wear behavior with respect to the component to be mounted. In particular, the component may be in the form of a bearing shell for a plain bearing.

The invention also relates to a process for producing a component having a sliding surface which is intended for the sliding support of another component, wherein a base body which is made at least partially of a light metal material is produced for the component, then the boundary surface of the light metal material is oxidized on the side which faces the sliding surface, wherein pores which are open toward the boundary surface are produced, and subsequently the boundary surface is coated with a solid lubricant layer. The process steps mentioned are described in the abstract of JP 05025696-A (already mentioned in the introduction).

Therefore, the object of the invention is also to specify a process for producing a component for the sliding support of another component, by means of which process this component can simultaneously be produced with a comparatively low weight and with a comparatively high mechanical strength.

According to the invention, this object is achieved in that, in the process mentioned above, the pores are filled with a hard material before coating with the solid lubricant layer, and the solid lubricant layer is produced as a metal alloy having a metallic matrix and a microstructure phase which is distributed therein and is made of a solid lubricant. The advantages of the layer produced by this process have already been explained further above—in particular, if a light metal material is used, it is possible for the boundary surface formed thereby to be oxidized, with the formation of pores, and for sufficient mechanical stability to be provided at the same time. This is achieved by filling the pores of the oxidized layer with a hard material, wherein this assembly of hard material and oxidized light metal material is provided with a metallic dry lubricant layer which carries the dry lubricant. At the same time, this advantageously results in mechanical protection of the boundary layer formed by the substrate.

One embodiment of the process according to the invention provides for the hard material to be introduced into the pores in the form of nanoparticles or micro hollow balls. Particularly in the case of pores having dimensions in the nanometer range, the use of nanoparticles has the advantage that simple filling of the pores is possible. The degree of filling can also advantageously be increased at the same time by using the nanoparticles, and so particularly hard and dense boundary layer regions are produced on the component. The use of micro hollow balls has the advantage that a relatively low degree of filling is achieved when the pores are filled, and a comparatively stable material composite is simultaneously produced in the form of a spatial network. The use of micro hollow balls has the further advantage that it is possible to increase the strength of the boundary layer region of the component, while reducing the weight, even with reduced material outlay.

Furthermore, it can advantageously be provided that the nanoparticles or micro hollow balls are dispersed in a dispersant with polar properties before they are introduced into the pores and, after they have been introduced into the pores, the filled pores are subjected to subsequent heat treatment. The subsequent treatment can firstly be used to expel the dispersant from the pores. It is also possible to provide the composite of nanoparticles or micro hollow balls in the pores with increased strength.

By way of example, the subsequent heat treatment may involve a sintering treatment. Here, solid material bridges are produced between the nanoparticles or micro hollow balls. Another possibility is to carry out the subsequent heat treatment by impingement with steam. This treatment is known in principle within the context of the subsequent treatment of eloxated aluminum, and is also referred to in this context as the water method.

It is also advantageous for the subsequent treatment to be preceded by a drying step. This takes place in temperature ranges in which merely the dispersant is expelled from the pores. This advantageously has the result that this process does not disrupt the microstructure formation process in the pores during the actual subsequent treatment.

BRIEF DESCRIPTION OF THE DRAWING

Further details of the invention are explained below with reference to the drawing. In the figures, identical or corresponding elements of the drawing are provided in each case with the same reference symbols and are explained repeatedly only if there are differences between the individual figures. In the drawing:

FIGS. 1-3 show an excerpt, close to the surface, from an exemplary embodiment of the component according to the invention, in different process stages of an exemplary embodiment of the process according to the invention.

DETAILED DESCRIPTION OF PREFERRED EMBODIMENTS

Figure 1:
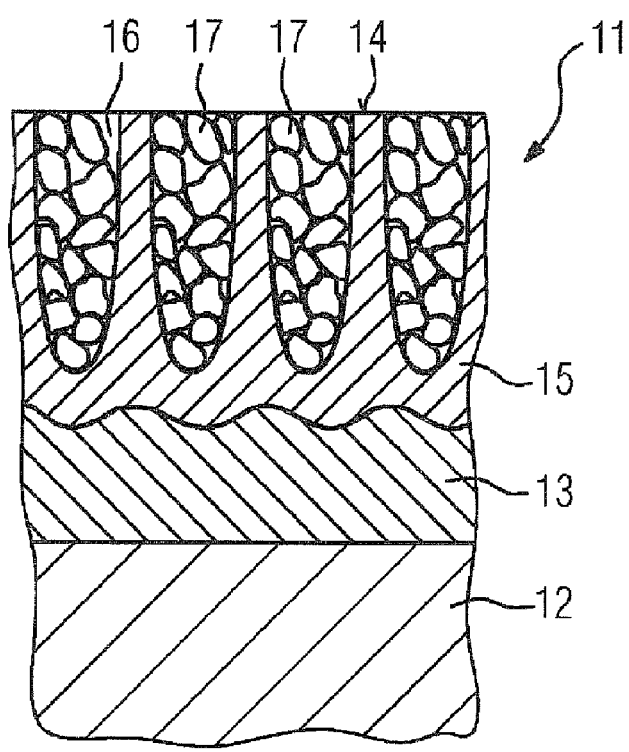

A component 11 as shown in FIG. 1 for support a component to be mounted comprises a base body 12, for example made of steel, and a layer made of a light metal material 13, for example an aluminum alloy. Proceeding from an exposed boundary surface 14, this aluminum alloy has been oxidized by an electrochemical eloxation treatment. In this process, an oxide layer 15, for example made of aluminum oxide, is produced adjacent to the boundary surface 14, and pores 16 which are open toward the boundary surface 14 are formed in said oxide layer.

In the next process step, which is also shown in FIG. 1, the pores 16 can be filled with nanoparticles 17. As an alternative to nanoparticles, it is also possible to use micro hollow balls. The nanoparticles are made of a hard material, e.g. boron nitride, and can also be dispersed in a dispersant, e.g. an alcohol. The dispersion produced in this way can simply be introduced into the pores 16.

Figure 2:
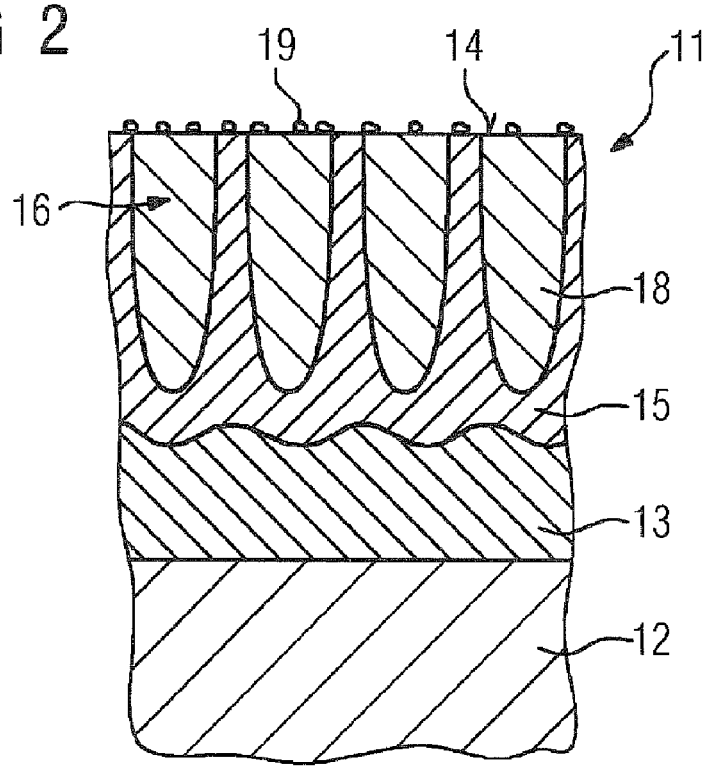

FIG. 2 shows the component 11 after a sintering heat treatment, by means of which firstly the dispersant has been expelled from the pores and secondly the nanoparticles have coalesced to form a single material composite of hard material 18. At the same time, the adhesion of this composite to the walls of the pores 16 is produced.

In a subsequent step, which is also shown in FIG. 2, an electrically conductive material in the form of particles 19 on the boundary layer is applied, for example by cold-gas spraying, to the boundary surface 14, which is then joined together by the webs between the pores 16 of the oxide layer and the hard material 18 located in the pores. In a subsequent production step, shown in FIG. 3, the electrical conductivity of this material makes it possible to apply a solid lubricant layer 20 by electrochemical means. This produces a metallic matrix 21 in which a particulate microstructure phase 22 of a solid lubricant is incorporated. By way of example, the incorporation can be carried out by feeding particles of a solid lubricant to the electrolyte used during the electrochemical coating and dispersing them therein. These are then incorporated in the layer which forms.

FIG. 3 shows a uniform distribution of the microstructure phase 22 made of solid lubricant. As already mentioned, however, it is also possible to produce other distributions, e.g. a multilayer solid lubricant layer or a gradient solid lubricant layer. Here, it is necessary, for example, to use a different electrolyte or an electrolyte of varying concentration for each layer during the electrochemical coating. By way of example, a first layer of the solid lubricant layer could be applied without particles of the solid lubricant and, in a second step, a layer with dispersed solid lubricants could be applied. Another possibility is to increase the concentration of dispersed solid lubricant in the electrolyte as the layer continues to be built up.

In the case of the component 11 shown in FIG. 3, the solid lubricant layer 20 forms a sliding surface 23 which, for example, could form a plain bearing for a component to be mounted (not shown). This solid lubricant layer has a ductile matrix 21, which distributes point loads F over a relatively large region b of the boundary surface 14 and thus reduces the mechanical loading on the brittle oxide layer 15 filled with hard material 18. Those parts of the microstructure phase 22 of the solid lubricant which are exposed at the surface 23 thereby provide the surface 23 with good sliding properties.

The following text is intended to provide further details regarding the process for producing the component according to the invention.

If aluminum is used as the light metal material, the formation of an oxide layer by natural passivation in the atmosphere is not sufficient. This applies in particular to aluminum alloys. Therefore, it is necessary to eloxate the surface of the aluminum or the alloys thereof in a suitable electrolyte. The component is anodized at room temperature or with a cooled electrolyte with a high current intensity, as a result of which a hard eloxate is produced. This can have a layer thickness of up to 200 µm. In addition, pores are produced as a result of the process, and the dimensions of these pores can lie in the micrometer or nanometer range. The electrolytes used are acid-containing media, such as sulfuric acid, phosphoric acid, oxalic acid, methanesulfonic acid or mixtures of these acids. It is possible to apply either a DC voltage or an AC voltage. The size of the pores can be set in a manner known per se by the process parameters, such as selection of the acid, concentration, temperature, voltage and time.

The pores are then filled completely with nanoparticles or micro hollow balls. These are made of silicon oxide, aluminum oxide, boron nitride, silicon carbide or mixtures of these compounds. In order to be able to process the particles, a dispersion is produced beforehand, and this can be present as a suspension or paste, depending on the type of dispersant and proportion of particles in the dispersion. Liquid alcohols are used as the polar dispersant. The alcohol may be present in monohydric form (e.g. ethanol, methanol, n-propanol, n-butanol) or in polyhydric form (e.g. glycol or glycerol). The hydrocarbon chains linked to the functional groups may be linear (e.g. n-propanol), branched (e.g. isopropanol) or cyclic (e.g. cyclohexanol). In addition, single bonds, double bonds and triple bonds can occur between the carbon atoms.

Furthermore, aromatic hydrocarbon compounds which comprise a benzene ring (e.g. vinyl or naphthyl compounds)

can also be used as the dispersant. Other groups can be present as substituents for the individual hydrogen atoms in the hydrocarbon chain (e.g. alkyl, alkenyl, alkynyl or aryl groups). In addition, water can be added to the dispersion, as a result of which the concentration of the other dispersants can be set within a wide range.

Depending on the viscosity of the dispersion, it can be applied by dipping, spinning, injecting, knife coating, brushing or rubbing.

If sintering is selected as the subsequent treatment, thermal energy has to be introduced into the component. This can be done using infrared radiation or UV radiation or else microwaves. If the pores are still not completely filled after the sintering, the process of introducing dispersion can be repeated and heat treatment can then be carried out again.

It is also possible to fill the eloxal pores in the aluminum by producing aluminum, boron or zirconium silicate in the pores. For this purpose, nanoscale aluminum-zirconium or silicon oxide is introduced into the pores in a dispersant such as silicic acid or boric acid. Aluminum, zirconium or boron silicate can be produced from these dispersions by thermal sintering after they are introduced into the eloxal pores.

Alternatively, the subsequent treatment can be carried out in order to compress or to close the pores with water or steam at 80 to 100° C., where an ammonium acetate solution can be added, for example, as additive. First of all, the aluminum oxide reacts with the water on the layer surface. This produces the water-rich bayerite which, as the temperature rises, can then slowly be converted into the stable crystalline boehmite. In this process, the volume increases owing to the uptake of water in the crystal lattice, and this results in narrowing of the pores until they close.

In the next step, the ductile metal layer of a nickel or nickel-cobalt alloy is applied, incorporating the solid lubricants (e.g. molybdenum sulfide). This can also take place in the form of a dispersion, by electrochemical coating or by cold-gas spraying.

What is claimed is:

1. A component comprising a sliding surface for sliding support of another component, said component being made at least partially of a metal material having a boundary surface which is oxidized on a side facing the sliding surface and provided with pores which are open toward the boundary surface, said boundary surface provided with a solid lubricant layer, wherein the pores are filled with a filler, wherein the solid lubricant layer is applied to the boundary surface with the filled pores and made of a metal alloy with a metallic matrix and a microstructure phase which is distributed in the metallic matrix and made of solid lubricant.

2. The component of claim 1, wherein the metal material is aluminum or an aluminum-based alloy.

3. The component of claim 1, wherein the filler is a compound selected from the group consisting of aluminum oxide, silicon oxide, cubic boron nitride, silicon carbide, titanium nitride, and a mixture thereof.

4. The component of claim 1, wherein the solid lubricant is a compound selected from the group consisting of molybdenum sulfide, tungsten sulfide, tantalum sulfide, graphite, and a mixture thereof.

5. The component of claim 1, wherein the metallic matrix of the solid lubricant layer is at least one alloy selected from the group consisting of nickel-containing alloy and cobalt-containing alloy.

6. The component of claim 1, constructed to form a bearing shell for a plain bearing.

7. A process for producing a component having a sliding surface for sliding support of another component, comprising the steps of:
 producing a base body made at least partially of a metal material;
 oxidizing a boundary surface of the metal material on a side which faces the sliding surface, thereby producing pores which are open toward the boundary surface;
 filling the pores with a filler;
 producing a solid lubricant layer as a metal alloy having a metallic matrix and a microstructure phase which is distributed in the metallic matrix and made of a solid lubricant; and
 coating the boundary surface with the solid lubricant layer.

8. The process of claim 7, wherein the filling step includes the step of introducing the filler hard into the pores in the form of nanoparticles or micro hollow balls.

9. The process of claim 8, wherein the nanoparticles or micro hollow balls are dispersed in a dispersant with polar properties before being introduced into the pores, and further comprising the step of heat treating the filled pores after being introduced into the pores.

10. The process of claim 9, wherein the heat treating step includes a sintering treatment.

11. The process of claim 9, wherein the heat treating step includes impingement with steam.

12. The process of claim 9, further comprising the step of drying the filled pores before the heat treating step.

* * * * *

UNITED STATES PATENT AND TRADEMARK OFFICE
CERTIFICATE OF CORRECTION

PATENT NO. : 8,314,053 B2
APPLICATION NO. : 12/676500
DATED : November 20, 2012
INVENTOR(S) : Jens Dahl Jensen et al.

Page 1 of 1

It is certified that error appears in the above-identified patent and that said Letters Patent is hereby corrected as shown below:

Column 8, line 34: delete "hard"

Signed and Sealed this
Fifth Day of February, 2013

Teresa Stanek Rea
*Acting Director of the United States Patent and Trademark Office*